United States Patent
Hiraoka

(10) Patent No.: US 9,650,530 B2
(45) Date of Patent: *May 16, 2017

(54) PHOTOPOLYMERIZABLE COMPOSITION, PHOTOPOLYMERIZABLE INKJET INK, AND INK CARTRIDGE

(71) Applicant: Ricoh Company, Ltd., Tokyo (JP)

(72) Inventor: Takao Hiraoka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/427,738

(22) PCT Filed: Sep. 12, 2013

(86) PCT No.: PCT/JP2013/075390
§ 371 (c)(1),
(2) Date: Mar. 12, 2015

(87) PCT Pub. No.: WO2014/050711
PCT Pub. Date: Apr. 3, 2014

(65) Prior Publication Data
US 2015/0259554 A1  Sep. 17, 2015

(30) Foreign Application Priority Data

Sep. 28, 2012 (JP) ................. 2012-215753

(51) Int. Cl.
*C09D 11/38* (2014.01)
*C09D 11/107* (2014.01)
(Continued)

(52) U.S. Cl.
CPC ............... *C09D 11/38* (2013.01); *C08F 2/48* (2013.01); *C08K 5/3492* (2013.01);
(Continued)

(58) Field of Classification Search
None
See application file for complete search history.

(56) References Cited

U.S. PATENT DOCUMENTS

| 5,723,512 | A | 3/1998 | Leppard et al. |
| 6,803,392 | B1 * | 10/2004 | Kohler ............ G03F 7/029 502/152 |

(Continued)

FOREIGN PATENT DOCUMENTS

| CN | 102576094 A | 7/2012 |
| CN | 102585597 A | 7/2012 |

(Continued)

OTHER PUBLICATIONS

International Search Report Issued Dec. 10, 2013 for counterpart International Patent Application No. PCT/JP2013/075390 filed Sep. 12, 2013.

(Continued)

*Primary Examiner* — An Do
*Assistant Examiner* — Renee I Wilson
(74) *Attorney, Agent, or Firm* — Oblon, McClelland, Maier & Neustadt, L.L.P.

(57) ABSTRACT

To provide a non-aqueous photopolymerizable composition, which contains: a (meth)acrylic acid ester compound containing at least diethylene glycol dimethacrylate; a photoradical polymerization initiator, which is at least one selected from the group consisting of 1- hydroxy- cyclohexyl- phenyl- ketone, 2- hydroxy- 2- methyl- 1- phenyl-propan- 1- one, and 2- hydroxy- 1- {4- [4- (2- hydroxy- 2-methyl- propionyl)benzyl]phenyl}- 2- methyl- 1- propan- 1-one; and a triazine compound, wherein an amount of the photoradical polymerization initiator is 10 parts by mass or greater relative to 100 parts by mass of the (meth)acrylic acid ester compound.

16 Claims, 1 Drawing Sheet

(51) Int. Cl.
  *C09D 11/322* (2014.01)
  *C09D 11/30* (2014.01)
  *C09D 11/101* (2014.01)
  *C08K 5/3492* (2006.01)
  *C08F 2/48* (2006.01)
  *C08F 222/10* (2006.01)

(52) U.S. Cl.
  CPC .......... *C09D 11/101* (2013.01); *C09D 11/107* (2013.01); *C09D 11/30* (2013.01); *C09D 11/322* (2013.01); *C08F 2222/1013* (2013.01)

(56) References Cited

U.S. PATENT DOCUMENTS

| | | |
|---|---|---|
| 2004/0145639 A1 | 7/2004 | Noutary |
| 2006/0158493 A1 | 7/2006 | Nakano et al. |
| 2010/0209669 A1 | 8/2010 | Aoai et al. |
| 2010/0247797 A1 | 9/2010 | Umebayashi |
| 2011/0237700 A1 | 9/2011 | Miyabayashi |
| 2012/0003435 A1 | 1/2012 | Kameyama et al. |
| 2012/0086762 A1 | 4/2012 | Noguchi et al. |
| 2012/0121858 A1 | 5/2012 | Kato |
| 2012/0147103 A1 | 6/2012 | Hasegawa et al. |
| 2012/0176456 A1 | 7/2012 | Maekawa et al. |
| 2012/0200648 A1 | 8/2012 | Hiraoka et al. |
| 2012/0242768 A1 | 9/2012 | Seno et al. |
| 2012/0244361 A1 | 9/2012 | Mitsuoka et al. |
| 2012/0293589 A1* | 11/2012 | Hiraoka ............... B41J 2/17553 347/86 |
| 2013/0065024 A1 | 3/2013 | Aruga et al. |
| 2013/0321539 A1 | 12/2013 | Hiraoka |
| 2014/0125744 A1 | 5/2014 | Hiraoka |

FOREIGN PATENT DOCUMENTS

| | | |
|---|---|---|
| JP | 07-278215 | 10/1995 |
| JP | 08-034807 | 2/1996 |
| JP | H10-204133 | 8/1998 |
| JP | 2004-526820 | 9/2004 |
| JP | 2005-350551 | 12/2005 |
| JP | A 2006-123459 | 5/2006 |
| JP | 2010-031272 | 2/2010 |
| JP | 2010-229284 | 10/2010 |
| JP | 2011-088054 | 5/2011 |
| JP | 2011-201973 | 10/2011 |
| JP | A 2012-012471 | 1/2012 |
| JP | 2012-140593 | 7/2012 |
| JP | 2012-167246 | 9/2012 |
| JP | 2012-184412 | 9/2012 |
| JP | 2012-255069 | 12/2012 |
| JP | 2012-255137 | 12/2012 |
| JP | 2013-181114 | 9/2013 |
| WO | WO 2013/129699 A1 | 9/2013 |

OTHER PUBLICATIONS

Combined Chinese Office Action and Search Report issued Nov. 3, 2015 in Patent Application No. 201380050688.8 (with English language translation).

Extended European Search Report issued Sep. 14, 2015 in Patent Application No. 13842846.1.

Korean Office Action issued Apr. 6, 2016, in corresponding Korean Patent Application No. 10-2015-7006357 filed Mar. 13, 2015, with English translation.

* cited by examiner

PHOTOPOLYMERIZABLE COMPOSITION, PHOTOPOLYMERIZABLE INKJET INK, AND INK CARTRIDGE

TECHNICAL FIELD

The present invention relates to a photopolymerizable composition, a photopolymerizable inkjet ink, and an ink cartridge housing the ink.

BACKGROUND ART

Photopolymerizable compositions and photopolymerizable inkjet inks using (meth)acrylic acid esters have been widely known (see PTL1).

However, many of monomers used in conventional photopolymerizable inkjet inks are toxic. Especially, most of (meth)acrylic acid esters, which are readily available with low cost, have high toxicity in terms of skin sensitivity, which causes allergy reactions with skin upon contact with them. Conventional art has not yet provided any solution to this problem.

Based on the studies conducted so far, the present inventors have found a few (meth)acrylic acid ester and (meth)acryl amide, which have no problem in skin sensitization. As for one of examples thereof, proposed is an inkjet ink containing methacrylate as a main component, as methacrylate is lower in toxicity in terms of skin sensitization than acrylate, as disclosed in Japanese Patent Application No. 2010-278177, and PTL 2.

However, in order to further improve performances, it has been desired to improve a strength of a cured coating film to enhance durability thereof against abrasions or the like, and to reduce a viscosity so that it can be ejected by inkjet without any problem even when an ink increases its viscosity as a result of formulated various materials, such as a pigment, and additives, therein. To reduce viscosity of an ink, water can be blended therein, and a photopolymerizable aqueous inkjet ink, to which water is blended, has been known. As described later, however, such ink is not penetrated and dried on a non-absorbent base. Use of such ink requires a step for evaporating water in order to increase speed or attain efficiency of a process. Moreover, a heat source is desired to be provided. Therefore, it is not preferable in view of energy saving. In the case where the photopolymerizable composition is used as a coating material used for brush coating, an organic solvent can be used therein. However, the organic solvent is evaporated and released in the atmosphere. In view of a possible influence to the environment, use of the organic solvent is preferably as little as possible. In the case where the photopolymerizable composition is used as an inkjet ink, if an organic solvent blended therein is highly volatile, the ink in a nozzle, through which the ink is jetted, increases its viscosity due to vaporization of the organic solvent, which may cause a problem in jetting. Therefore, such ink is not preferable.

In view of these points mentioned above, the present inventors have invented technologies disclosed in Japanese Patent Application Nos. 2012-46301 and 2012-113970. However, further improvement in a coating strength thereof has been desired to resist under more severe conditions, as it is used to protect surfaces of housing or molded products. Therefore, it is desired to attain a coating film having higher durability than that disclosed in Japanese Patent Application No. 2012-46301. As for the durability of the coating film formed to protect surfaces, it is also required, other than sufficient solidness, that an appearance does not change even when it is exposed to direct sun light.

Moreover, if a solid coating film is produced using the photopolymerizable composition, not by printing a certain image pattern, not only an inkjet system, but also a method, such as spray coating, and brush coating, can be employed. It is however difficult to provide a coating film, which has no problem of skin sensitization, and has high strength and excellent light fastness, regardless of a coating system.

CITATION LIST

Patent Literature

PTL 1: Japanese Patent Application Laid-Open (JP-A) No. 2004-526820
PTL 2: JP-A No. 2012-140593

SUMMARY OF INVENTION

Technical Problem

The present invention aims to provide a non-aqueous photopolymerizable composition, which has no problem of skin sensitization, achieve both low viscosity and improved strength of a cured coating film, and also achieve an improvement in light fastness of the cured coating film.

Solution to Problem

As the means for solving the aforementioned problem, the non-aqueous photopolymerizable composition of the present invention contains:
a (meth)acrylic acid ester compound containing at least diethylene glycol dimethacrylate;
a photoradical polymerization initiator, which is at least one selected from the group consisting of 1-hydroxy-cyclohexyl-phenyl-ketone, 2-hydroxy-2-methyl-1-phenyl-propan-1-one, and 2-hydroxy-1-{4-[4-(2-hydroxy-2-methyl-propionyl)benzyl]phenyl}-2-methyl-1-propan-1-one; and
a triazine compound,
wherein an amount of the photoradical polymerization initiator is 10 parts by mass or greater relative to 100 parts by mass of the (meth)acrylic acid ester compound.

Advantageous Effects of Invention

The present invention can provide a photopolymerizable composition, which has no problem of skin sensitization, achieve both low viscosity and improved strength of a cured coating film, and also achieve an improvement in light fastness of the cured coating film.

Moreover, the photopolymerizable composition is easily handled, as odor thereof is weak, and a coated product obtained using the photopolymerizable composition has no problem of skin sensitization even if a small amount of an uncured monomer component is remained, and does not cause skin sensitization even when it is touched with hands or fingers. Accordingly, high safety can be secured.

Figure 1:
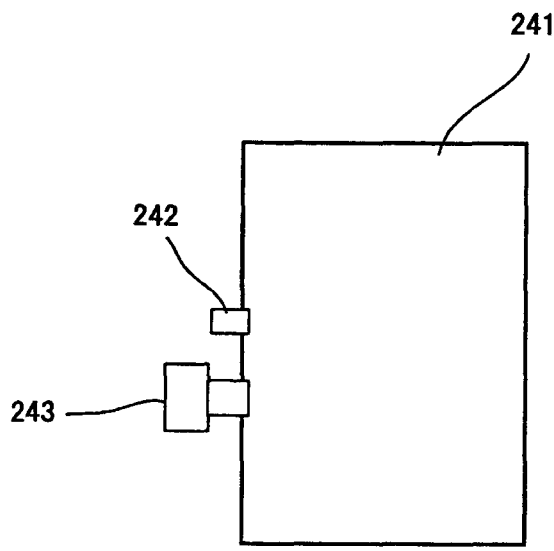
FIG. 1 is a schematic diagram illustrating one example of an ink bag of an ink cartridge.

DESCRIPTION OF EMBODIMENTS (Non-Aqueous Photopolymerizable Composition)
The non-aqueous photopolymerizable composition of the present invention contains: a (meth)acrylic acid ester compound containing at least diethylene glycol dimethacrylate; a photoradical polymerization initiator, which is at least one selected from the group consisting of 1-hydroxy-cyclohexyl-phenyl-ketone, 2-hydroxy-2-methyl-1-phenyl-propan-1-one, and 2-hydroxy-1-{4-[4-(2-hydroxy-2-methyl-propionyl)benzyl]phenyl}-2-methyl-1-propan-1-one; and a triazine compound, preferably further contains a hindered amine compound, and may further contain other components, if necessary.

The present inventors have found that 10 parts by mass or greater of 1-hydroxy-cyclohexyl-phenyl-ketone, 2-hydroxy-2-methyl-1-phenyl-propan-1-one, and/or 2-hydroxy-1-{4-[4-(2-hydroxy-2-methyl-propionyl)benzyl]phenyl}-2-methyl-1-propan-1-one is blended as the polymerization initiator relative to 100 parts by mass of (meth)acrylic acid ester, in order to give practical curing ability to a monomer composition produced using a (meth)acrylic acid ester compound negative for skin sensitization to have a viscosity ejectable by inkjet, as the photopolymerizable composition (may also referred to as "ink" hereinafter). In this case, however, light fastness of the cured coating film thereof is poor, and the coating film turns significantly yellow upon application of light.

When the photopolymerizable composition contains a triazine compound, such as 2-[4-{(2-hydroxy-3-(C10-16 alkyl)oxypropyl)oxy}-2-hydroxyphenyl]-4,6-bis(2,4-dimethylphenyl)-1,3,5-triazine, 2-[4-{(2-hydroxy-3-(2'-ethyl)hexyl)oxy}-2-hydroxyphenyl]-4,6-bis(2,4-dimethylphenyl)-1,3,5-triazine, and 2,4-bis(2-hydroxy-4-butoxyphenyl)-6-(2,4-bis-butoxyphenyl)-1,3,5-triazine, yellowing is significantly inhibited. Of course, these triazine compounds can be used in combination. Note that, photocuring and yellowing are both phenomena caused by application of light, and therefore, excellent curing ability is obtained but resulting in significant yellowing if the photopolymerizable composition or cured coating film thereof passes through light sufficiently, and the photopolymerizable composition cannot be cured and a coating film cannot be produced, if the photopolymerizable composition shields light. However, it has been found that the photopolymerizable composition of the present invention significantly inhibits yellowing while maintaining sufficient curing ability on practical use.

Moreover, it has been found that the degree of yellowing can be prevented with maintaining the coating film strength, by adding a hindered amine compound together with those mentioned above.

Examples of the hindered amine compound include bis [2,2,6,6-tetramethyl-1-(octyloxy)piperidin-4-yl]sebacate.

Here, the photopolymerizable monomer negative for skin sensitization refers to a compound that satisfies at least one of the following skin sensitization evaluations (1) to (2).
(1) A compound having a Stimulation Index (SI value) of less than 3, where the Stimulation Index indicates the level of sensitization as measured by a skin sensitization test based on the LLNA (Local Lymph Node Assay).
(2) A compound evaluated as "negative for skin sensitization" or "no skin sensitization" in its material safety data sheet (MSDS).

Regarding the above (1), the compound having a SI value of less than 3 is considered negative for skin sensitization as described in literatures, for example, "Functional Material" (*Kino Zairyou*) 2005, September, Vol. 25, No. 9, p. 55. The lower SI value means lower skin sensitization. Thus, in the present invention, a monomer having lower SI value is preferably used. The SI value of the monomer used is preferably less than 3, more preferably 2 or lower, even more preferably 1.6 or lower.

Among (meth)acrylic acid ester compounds that are monomers readily available at low cost, those negative for skin sensitization have low polymerization reactivity. In order to give sufficient curing ability to a resulting photopolymerizable monomer on practical use, a photopolymerization initiator, which is any one, or two or more selected from the group consisting of 1-hydroxy-cyclohexyl-phenyl-ketone, 2-hydroxy-2-methyl-1-phenyl-propan-1-one, and 2-hydroxy-1-{4-[4-(2-hydroxy-2-methyl-propionyl)benzyl]phenyl}-2-methyl-1-propan-1-one, is used in an amount of 10 parts by mass of greater relative to 100 parts by mass of the (meth)acrylic acid ester compound negative for skin sensitization.

When an excessive amount of the polymerization initiator is blended, light fastness of a resulting photopolymerizable composition is impaired and yellowing of a cured coating film thereof becomes significant. Therefore, an amount of the polymerization initiator is preferably 20 parts by mass or smaller.

Moreover, use of the triazine compound, such as 2-[4-{(2-hydroxy-3-($C_{10}$ to $C_{16}$ alkyl)oxypropyl)oxy}-2-hydroxyphenyl]-4,6-bis(2,4-dimethylphenyl)-1,3,5-triazine, 2-[4-{(2-hydroxy-3-(2'-ethyl)hexyl)oxy}-2-hydroxyphenyl]-4,6-bis(2,4-dimethylphenyl)-1,3,5-triazine, and 2,4-bis (2-hydroxy-4-butoxyphenyl)-6-(2,4-bis-butoxyphenyl)-1,3, 5-triazine in an excessively small amount cannot expect an effect of sufficiently improving light fastness. Use thereof in an excessively large amount not only inhibits photocuring, but also increases a viscosity of a resulting photopolymerizable composition, which may often lead to instability in ink jetting when the photopolymerizable composition is used as an inkjet ink. Accordingly, an amount of the triazine compound is preferably 0.1 parts by mass to 5 parts by mass relative to 100 parts by mass of the (meth)acrylic acid ester compound.

As for an amount of the hindered amine compound, similarly to the triazine compound, an excessively small or large amount thereof is not preferable. The amount of the hindered amine compound is preferably 0.1 parts by mass to 5 parts by mass relative to 100 parts by mass of the (meth)acrylic acid ester compound. Similarly to the triazine compound, moreover, a plurality of hindered amines may be used in combination as the hindered amine compound. For example, hindered amine having the stronger deterioration resistance function (promptly autooxidizing to reduce an effect of oxidization) and hindered amine having the weaker deterioration resistance function (exhibiting slow-acting autooxidization) can be used in combination.

Moreover, the following (meth)acrylate, and (meth)acryl amide, which may have a problem of skin sensitization as used alone, or which is a compound whose skin sensitization has not been confirmed, can be used together with diethylene glycol dimethacrylate, provided that they do not adversely affect a resulting photopolymerizable composition.

Examples of such (meth)acrylate and (meth)acryl amide include ethylene glycol di(meth)acrylate, hydroxy pivalic acid neopentyl glycol di(meth)acrylate, γ-butyrolactone acrylate, isobornyl(meth)acrylate, formulated trimethylol propane mono(meth)acrylate, polytetramethylene glycol di(meth)acrylate, trimethylol propane(meth)acrylic acid benzoate, diethylene glycol diacrylate, triethylene glycol di(meth)acrylate, tetraethylene glycol di(meth)acrylate, polyethylene glycol di(meth)acrylate[$CH_2$=CH—CO—($OC_2H_4$)n-OCOCH=$CH_2$ (n≈4)], $CH_2$=CH—CO—($OC_2H_4$)n-OCOCH=$CH_2$ (n≈9)], $CH_2$=CH—CO—($OC_2H_4$)n-OCOCH=$CH_2$ (n≈14)], $CH_2$=CH—CO—($OC_2H_4$)n-OCOCH=$CH_2$ (n≈23)], dipropylene glycol di(meth)acrylate, tripropylene glycol di(meth)acrylate, polypropylene glycol dimethacrylate[$CH_2$=$C(CH_3)$—CO—$(OC_3H_6)$n-OCOC($CH_3$)=$CH_2$ (n≈7)], 1,3-dibutanediol diacrylate, 1,4-dibutanediol di(meth)acrylate, 1,6-hexanediol di(meth)acrylate, 1,9-nonanediol di(meth)acrylate, neopentyl glycol di(meth)acrylate, tricyclodecane dimethanol di(meth)acrylate, propylene oxide-modified bisphenol A di(meth)acrylate, polyethylene glycol di(meth)acrylate, dipentaerythritol hexa(meth)acrylate, (meth)acryloyl morpholine, 2-hydroxypropyl(meth)acryl amide, propylene oxide-modified tetramethylol methane tetra(meth)acrylate, dipentaerythritol hydroxypenta(meth)acrylate, caprolactone-modified dipentaerythritol hydroxy penta(meth)acrylate, ditrimethylol propane tetra(meth)acrylate, pentaerythritol tetra(meth)acrylate, trimethylol propane triacrylate, ethylene oxide-modified trimethylol propane triacrylate, propylene oxide-modified trimethylol propane tri(meth)acrylate, caprolactone-modified trimethylol propane tri(meth)acrylate, pentaerythritol tri(meth)acrylate, tris(2-hydroxyethyl)isocyanurate tri(meth)acrylate, ethoxylated neopentyl glycol di(meth)acrylate, propylene oxide-modified neopentylglycol di(meth)acrylate, propylene oxide-modified glyceryl tri(meth)acrylate, polyester di(meth)acrylate, polyester tri(meth)acrylate, polyestertetra(meth)acrylate, polyester penta(meth)acrylate, polyester poly(meth)acrylate, N-vinylcaprolactam, N-vinylpyrrolidone, N-vinyl formamide, polyurethane di(meth)acrylate, polyurethane tri(meth)acrylate, polyurethane tetra(meth)acrylate, polyurethane penta(meth)acrylate, and polyurethane poly(meth)acrylate.

A mass ratio of diethylene glycol dimethacrylate to (meth)acrylate or (meth)acryl amide usable with diethylene glycol dimethacrylate depends on various conditions, such as curing properties, and viscosity, but is preferably 100/0 to 3/97, more preferably 95/5 to 10/90.

<Photopolymerization Initiator>

To the photopolymerizable composition of the present invention, a photoradical polymerizable initiator, which is at least one selected from the group consisting of 1-hydroxy-cyclohexyl-phenyl-ketone, 2-hydroxy-2-methyl-1-phenyl-propan-1-one, and 2-hydroxy-1-{4-[4-(2-hydroxy-2-methyl-propionyl)benzyl]phenyl}-2-methyl-1-propan-1-one, is used.

(Meth)acrylic ester and (meth)acryl amide have been known to have ionic polymerization property as well. Ionic polymerization initiators are typically expensive and also generate a slight amount of strong acid and strong alkali even in the state where there is any irradiation of light. Therefore, it is necessary to take special cares, such as imparting acid or alkali resistance to an ink supply channel inside an inkjet coating system.

Accordingly, there is limitation on the choice of a member constituting an inkjet coating system.

In contrast, the photopolymerizable composition (ink) can use a photoradical polymerization initiator that is inexpensive and generates no strong acid or strong alkali. Therefore, it is possible to produce a photopolymerization composition at low cost, and also it is easy to elect a member constituting an inkjet coating system. Note that, in the case where a quite high energy light source, such as electron beams, α rays, β rays, γ rays or X rays, a polymerization reaction can proceed without polymerization initiator. This is a conventionally known matter, and has a problem, such as a facility thereof is very expensive and maintenance thereof is complicated. Therefore, it is not particularly described in details in the present specification.

The photoradical polymerization initiator includes, for example, a self-cleaving photopolymerization initiator and a hydrogen-abstracting polymerization initiator. Other than 1-hydroxy-cyclohexyl-phenyl-ketone, 2-hydroxy-2-methyl-1-phenyl-propan-1-one, and 2-hydroxy-1-{4-[4-(2-hydroxy-2-methyl-propionyl)benzyl]phenyl}-2-methyl-1-propan-1-one, compounds listed below can be used in combination as the photoradical polymerization initiator.

Examples of the self-cleaving photopolymerization initiator include 2,2-dimethoxy-1,2-diphenylethan-1-one, 21-[4-(2-hydroxyethoxy)-phenyl]-2-hydroxy-2-methyl-1-propan-1-one, phenylglyoxylic acid methyl ester, 2-methyl-1-[4-(methylthio)phenyl]-2-morpholinopropan-1-one, 2-benzyl-2-dimethylamino-1-(4-morpholinophenyl)butanone-1,2-dimethylamino-2-(4-methylbenzyl)-1-(4-morpholin-4-yl-phenyl) butan-1-one, bis(2,4,6-trimethylbenzoyl)phenylphosphine oxide, bis(2,6-dimethoxybenzolyl)-2,4,4-trimethyl-pentylphosphine oxide, 2,4,6-trimethylbenzoylphosphine oxide, 1,2-octanedion-[4-(phenylthio)-2-(o-benzoyloxime)], ethanone-1-[9-ethyl-6-(2-methylbenzoyl)-9H-carbazol-3-yl]-1-(O-acetyloxime), and [4-(methylphenylthio)phenyl]phenylmethanone.

Examples of the hydrogen-abstracting polymerization initiator include: benzophenone compounds such as benzophenone, methylbenzophenone, methyl-2-benzoylbenzoate, 4-benzoyl-4'-methyldiphenyl sulfide and phenylbenzophenone; and thioxanthone compounds such as 2,4-diethylthioxanthone, 2-chlorothioxanthone, isopropylthioxanthone and 1-chloro-4-propylthioxanthone.

Moreover, amine can be used in combination, as the polymerization accelerator.

Examples of the polymerization accelerator include ethyl p-dimethylaminobenzoate, 2-ethylhexyl p-dimethylaminobenzoate, methyl p-dimethylaminobenzoate, 2-dimethylaminoethyl benzoate and butoxyethyl p-dimethylaminobenzoate.

<Other Components>

Examples of other components include a colorant, a polymerization inhibitor, a surfactant, and a polar group-containing high molecular pigment dispersant.

—Colorant—

The photopolymerizable composition may be made transparent without containing a colorant, and may contain a colorant, if necessary. In the case where a clear or white photopolymerizable composition is desirable, it is preferred that less tinted materials be selected for the aforementioned materials, such as the polymerization initiator, and the polymerization accelerator, and the below-mentioned materials other than the colorant.

As for the colorant in the case where the photopolymerizable composition is tinted, any of conventional inorganic pigments or organic pigments can be used.

As for the black pigment, carbon black produced by a furnace method or a channel method can be used.

Examples of the yellow pigment include pigments of Pigment Yellow series, such as Pigment Yellow 1, Pigment Yellow 2, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 75, Pigment Yellow 83, Pigment Yellow 93, Pigment Yellow 95, Pigment Yellow 97, Pigment Yellow 98, Pigment Yellow 114, Pigment Yellow 120, Pigment Yellow 128, Pigment Yellow 129, Pigment Yellow 138, Pigment Yellow 150, Pigment Yellow 151, Pigment Yellow 154, Pigment Yellow 155, and Pigment Yellow 180.

Examples of the magenta pigment include pigments of Pigment Red series, such as Pigment Red 5, Pigment Red 7, Pigment Red 12, Pigment Red 48(Ca), Pigment Red 48(Mn), Pigment Red 57(Ca), Pigment Red 57:1, Pigment Red 112, Pigment Red 122, Pigment Red 123, Pigment Red 168, Pigment Red 184, Pigment Red 202, and Pigment Violet 19.

Examples of the cyan pigment include pigment of Pigment Blue series, such as Pigment Blue 1, Pigment Blue 2, Pigment Blue 3, Pigment Blue 15, Pigment Blue 15:3, Pigment Blue 15:4, Pigment Blue 16, Pigment Blue 22, Pigment Blue 60, Vat Blue 4, and Vat Blue 60.

Examples of the white pigment or clear filler for modifying physical properties include: sulfuric acid salts of alkaline earth metals such as barium sulfate; carbonic acid salts of alkaline earth metals such as calcium carbonate; silica such as fine silicic acid powder and synthetic silicic acid salts; calcium silicate; alumina; alumina hydrate; titanium oxide; zinc oxide; talc; and clay.

In addition, various inorganic or organic pigments may optionally be used considering, for example, physical properties of the photopolymerizable composition.

—Polymerization Inhibitor—

Examples of the polymerization inhibitor include 4-methoxy-1-naphthol, methylhydroquinone, hydroquinone, t-butylhydroquinone, di-t-butylhydroquinone, methoquinone, 2,2'-dihydroxy-3,3'-di(α-methylcyclohexyl)-5,5'-dimethyldiphenyl methane, p-benzoquinone, di-t-butylbutyl diphenylamine, 9,10-di-n-butoxyanthracene, 4,4'-[1,10-dioxo-1,10-decandiylbis(oxy)]bis[2,2,6,6-tetramethyl]-1-piperidinyloxy.

—Surfactant—

Examples of the surfactant include higher fatty acid ester containing polyether, an amino group, a carboxyl group, or a hydroxyl group, and a fluoroalkyl compound containing polyether, an amino group, a carboxyl group, or a hydroxyl group.

(Ink Cartridge)

The ink of the present invention may be housed in a container, and used as an ink cartridge. With this form, users do not have to directly touch the ink during operations such as exchange of the ink, and thus they are not concerned with staining of their fingers, hands or clothes. In addition, it is possible to prevent interfusion of foreign matter such as dust into the ink.

The container is not particularly limited, and the shape, structure, size and material thereof may be appropriately selected depending on the intended purpose. For example, the container is preferably selected from those having an ink bag formed of an aluminum laminate film, or a resin film.

Figure 2:
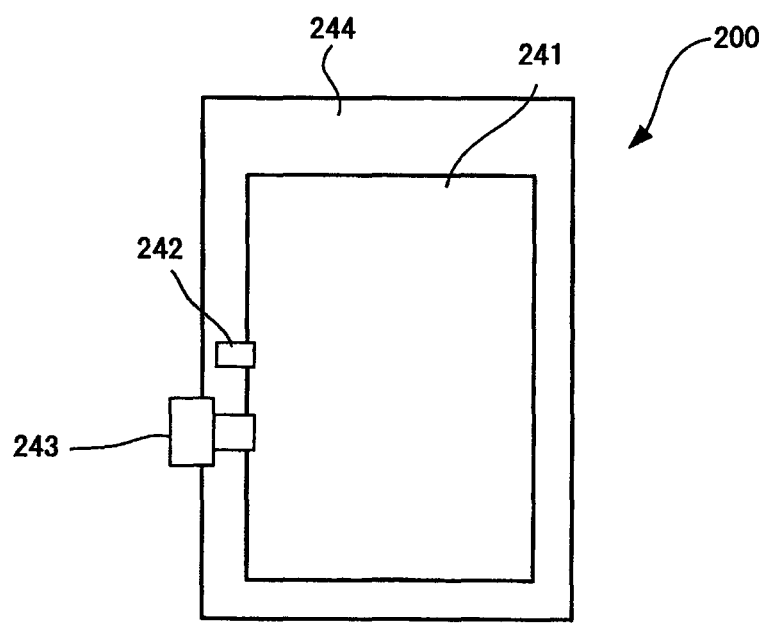
FIG. 2 is a schematic diagram illustrating one example of the ink cartridge housing the ink bag.

The ink cartridge will be described with reference to FIGS. 1 and 2. FIG. 1 is a schematic diagram illustrating one example of the ink bag 241 of the ink cartridge, and FIG. 2 is a schematic diagram illustrating the ink cartridge 200 housing the ink bag 241 of FIG. 1 in the cartridge case 244 thereof.

As illustrated in FIG. 1, the ink bag 241 is filled with the ink by injecting the ink from an ink inlet 242. After removing the air present inside the ink bag 241, the ink inlet 242 is sealed by fusion bonding. At the time of use, a needle attached to the main body of the device is inserted into an ink outlet 243 formed of a rubber member to supply the ink to the device. The ink bag 241 is formed of a wrapping member, such as an air non-permeable aluminum laminate film. As illustrated in FIG. 2, the ink bag 241 is typically housed in a plastic cartridge case 244, which is then detachably mounted in use to various inkjet recording devices as the ink cartridge 200.

The ink cartridge of the present invention is preferably detachably mounted to inkjet recording devices. As a result of this, refill or replacement of the ink can be simplified, and workability can be improved.

As for a coating base, paper, plastic, metal, ceramic, glass, or a composite material thereof may be used. Since an absorbent base, such as wood free paper, can expect an effect of penetrating and drying, an aqueous ink or an oil ink, which is not a quick-drying ink, can be used for such base. On the other hand, it is practical to use a quick-drying ink for a base of low absorbency or a non-absorbent base, such as gloss coat paper, a plastic film, a plastic molded article, ceramic, glass, metal, and rubber.

The ink of the present invention does not particularly restrict a base to be used. As the ink is cured immediately upon application of light, however, the aforementioned non-absorbent base is particularly preferable. Among them, suitable are plastic films and a plastic molded articles formed of polyethylene, polypropylene, polyethylene terephthalate, polycarbonate, an ABS resin, polyvinyl chloride, polystyrene, other polyesters, polyamide, vinyl-based materials, and composite materials thereof.

EXAMPLES

The present invention will be concretely explained through Examples and Comparative Examples hereinafter, but Examples shall not be construed as to limit the scope of the present invention.

<Evaluation Method of SI Value>

According to the skin sensitization test based on the LLNA (Local Lymph Node Assay), the SI value was measured in the below described manner.

[Test Material]

<<Positive Control>>

α-Hexylcinnamaldehyde (HCA; product of Wako Pure Chemical Industries, Ltd.) was used as the positive control.

<<Vehicle>>

As a vehicle, a mixture containing acetone (product of Wako Pure Chemical Industries, Ltd.) and olive oil (product of Fudimi Pharmaceutical Co., Ltd.) in a volume ratio of 4/1 was used.

<<Animals Used>>

Before treated with the test substances, the positive control or the vehicle control, female mice were acclimated for 8 days including 6-day quarantine. No abnormalities were found in all the animals during the quarantine/acclimation period.

Based on the body weights measured 2 days before the initiation of sensitization, they were categorized into 2 groups (4 mice/group) by the body weight stratified random sampling method so that the body weight of each individual was within ±20% of the average body weight of all the individuals. Each animal was 8 weeks old to 9 weeks old at the time of the initiation of sensitization. The animals remaining after the categorization were excluded from the test.

The animals were individually identified by application of oil ink to their tale throughout the test period, and also their cages were labeled for identification.

<<Housing Environment>>

Throughout the housing period including the quarantine/acclimation period, the animals were housed in an animal room with barrier system, which was set as follows: 21° C. to 25° C. in temperature, 40% to 70% in relative humidity, 10 times/hour to 15 times/hour in frequency of air circulation, and 12 hours in lighting cycle (lighting from 7:00 to 19:00).

The housing cages used were those made of polycarbonate, and four animals were housed in each cage.

The animals were given adlibitum solid diet for laboratory animals MF (product of Oriental Yeast Co., Ltd.). Also, using a water-supply bottle, they were given ad libitum tap water in which sodium hypochlorite (PURELOX, product of OYALOX Co., Ltd.) had been added so that the chlorine concentration was about 5 ppm. Bedding used was SUN-FLAKE (fir tree, shavings obtained with a power planer) (product of Charles River Inc.). The diet and feeding equipment were sterilized with an autoclave (121° C., 30 min) before use.

The cage and bedding were replaced with new ones at the times of the categorization and the removal of the auricular lymph node (i.e., the time when the animals were transferred from the animal room), and the water-supply bottle and rack were replaced with new ones at the time of the categorization.

[Test Method]

<<Group Composition>>

The group composition used for the measurement of the Si value is shown in Table 1.

TABLE 1

| Test group | Sensitization substance | Sensitization dose (µL/auricle) | Times of sensitization | Number of animals (animal No.) |
|---|---|---|---|---|
| Vehicle control group | Vehicle only | 25 | Once/day × 3 days | 4 (1-4) |
| Positive control group | 25.0% HCA | 25 | Once/day × 3 days | 4 (5-8) |

[Preparation]

<<Test Substance>>

Table 2 shows the amount of the test substance. The test substance was weighed in a measuring flask, and the volume of the test substance was adjusted to 1 mL with a vehicle. The thus-prepared solution was placed in a light-shielded airtight container (made of glass).

TABLE 2

| | Concentration after adjustment (w/v %) | Mass of test substance (g) |
|---|---|---|
| Test substance | 50.0 | 0.5 |

<<Positive Control Substance>>

About 0.25 g of HCA was accurately weighed, and a vehicle was added to the HCA to have the volume of 1 mL, to thereby prepare a 25.0 w/v % solution. The thus-prepared solution was placed in a light-shielded airtight container (made of glass).

<<BrdU>>

In a measuring flask, 200 mg of 5-bromo-2'-deoxyuridine (BrdU, product of NACALAI TESQUE, INC.) was accurately weighed. Then, physiological saline (product of OTSUKA PHARMACEUTICAL CO., LTD.) was added to the measuring flask, and dissolved through application of ultrasonic waves. The volume of the resultant solution was adjusted to 20 mL to prepare a 10 mg/mL solution (BrdU preparation). The thus-prepared solution was sterilized through filtration with a sterilized filtration filter and placed in a sterilized container.

<<Preparation Day and Storage Period>>

The positive control preparation was prepared on the day before the initiation of sensitization, and stored in a cold place except in use. The vehicle and the test substance preparations were prepared on the day of sensitization. The BrdU solution was prepared 2 days before administration and stored in a cold place until the day of administration.

[Sensitization and Administration of BrdU]

<<Sensitization>>

Each (25 µL) of the test substance preparations, the positive control preparation and the vehicle was applied to both the auricles of each animal using a micropipetter. This treatment was performed once a day for three consecutive days.

<<Administration of BrdU>>

About 48 hours after the final sensitization, the BrdU preparation (0.5 mL) was intraperitoneally administered once to each animal.

[Observation and Examination]

<<General Conditions>>

All the animals used for the test were observed once or more times a day from the day of the initiation of sensitization to the day of the removal of the auricular lymph node (i.e., the day when the animals were transferred from the animal room). Notably, the observation day was counted from the day of the initiation of sensitization being regarded as Day 1.

<<Measurement of Body Weights>>

The body weight of each animal was measured on the day of the initiation of sensitization and on the day of the removal of the auricular lymph node (i.e., the day when the animals were transferred from the animal room). Also, the average of the body weights and the standard error thereof were calculated for each group.

<<Removal of Auricular Lymph Node and Measurement of Mass Thereof>>

About 24 hours after the administration of BrdU, the animals were allowed to undergo euthanasia, and their auricular lymph nodes were sampled. The surrounding tissue of each auricular lymph node was removed, and the auricular lymph nodes from both the auricles were collectively weighed. Also, the average of the weights of the auricular lymph nodes and the standard error thereof were calculated for each group. After the measurement of the weights, the auricular lymph nodes of each individual were stored in a frozen state using a BIO MEDICAL FREEZER set to −20° C.

<<Measurement of BrdU Intake>>

After returned to room temperature, the auricular lymph nodes were mashed with the gradual addition of physiological saline, and suspended therein. The thus-obtained suspension was filtrated and then dispensed into the wells of a 96-well microplate, with 3 wells being used per individual. The thus-dispensed suspensions were measured for intake of BrdU by the ELISA method. The reagents used were those of a commercially available kit (Cell Proliferation ELISA, BrdU colorimetric, Cat. No. 1647229, product of Roche Diagnostics Inc.). A multiplate reader (FLUOSTAR OPTIMA, product of BMG LABTECH Inc.) was used to measure the absorbance of each well (OD: 370 nm to 492 nm, the intake of BrdU), and the average of the absorbance of the 3 wells for each individual was used as the measurement of BrdU for the individual.

[Evaluation of Results]

<<Calculation of Stimulation Index (SI)>>

As shown in the following formula, the measurement of BrdU intake for each individual was divided by the average of the measurements of BrdU intake in the vehicle control group to calculate the SI value for the individual. The SI value of each test group was the average of the SI values of the individuals. Notably, the SI value was rounded at the second decimal place and shown to the first decimal place.

$$SI = \frac{\text{Average of measurements of } BrdU \text{ intake for each individual (average of 3 wells)}}{\text{Average of measurements of } BrdU \text{ intake in the vehicle control group (average of 4 animals)}}$$

Preparation of Inks of Examples 1 to 42, and Inks of Comparative Examples 1 to 6

Each ink was obtained by mixing the following materials (a) to (d) at the blending ratio (numerical value represented part(s) by mass) depicted in each column of Examples in Tables 3 to 8.
(a) (meth)acrylic acid ester negative for skin sensitization
(b) photoradical polymerization initiator
(c) triazine compound
(d) hindered amine compound In Tables 3 to 8, the details of a1 to a3, b1 to b3, c1 to c3, and d1 to d2 are as described below. The numerical value in the parenthesis is the SI value in the LLNA test in the (1). The description "no" after each product name means that the product is evaluated as "negative for skin sensitization" or "no skin sensitization" in the MSDS (Material Safety Data Sheet) described in the above skin sensitization evaluation (2). Similarly, the description "yes" after each product name means that the product is evaluated as "positive for skin sensitization" or "skin sensitization" in the MSDS.

a1: diethylene glycol dimethacrylate, 2G (1.1), manufactured by Shin-Nakamura Chemical Co., Ltd.
a2: caprolactone-modified dipentaerythritol hexaacrylate, DPCA-60 (no), manufactured by NIPPON KAYAKU Co., Ltd.
a3: ethylene oxide-modified trimethylol propane trimethacrylate, TMPT-3EO (1.0), manufactured by Shin-Nakamura Chemical Co., Ltd.
b1: 1-hydroxycyclohexylphenylketone, Irgacure 184 (no: evaluated in MSDS), manufactured by BASF
b2: 2-hydroxy-2-methyl-1-phenylpropan-1-one, Darocur 1173 (no: evaluated in MSDS), manufactured by BASF
b3: 2-hydroxy-1-{4-[4-(2-hydroxy-2-methylpropionyl)benzyl]phenyl}-2-methyl-1-propan-1-one, Irgacure 127 (no: evaluated in MSDS), manufactured by BASF
c1: 2-[4-{(2-hydroxy-3-(C10-16 alkyl)oxypropyl)oxy}-2-hydroxyphenyl]-4,6-bis(2,4-dimethylphenyl)-1,3,5-triazine, TINUVIN 400 (no: evaluated in MSDS), manufactured by BASF, *used after evaporating a small amount of the solvent contained
c2: 2-[4-{(2-hydroxy-3-(2'-ethyl)hexyl)oxy}-2-hydroxyphenyl]-4,6-bis(2,4-dimethylphenyl)-1,3,5-triazine, TINUVIN 405 (no: evaluated in MSDS), manufactured by BASF
c3: 2,4-bis(2-hydroxy-4-butoxyphenyl)-6-(2,4-bis-butoxyphenyl)-1,3,5-triazine, TINUVIN 460 (no: evaluated in MSDS), manufactured by BASF
c4: 2-[2-hydroxy-4-(1-octyloxycarbonylethoxy)phenyl]-4,6-bis(4-phenylphenyl)-1,3,5-triazine, TINUVIN 479 (no: evaluated in MSDS), manufactured by BASF
d1: bis[2,2,6,6-tetramethyl-1-(octyloxy)piperidin-4-yl]sebacate TINUVIN 123 (no: evaluated in MSDS), manufactured by BASF
d2: a mixture of bis[1,2,2,6,6-pentamethyl-piperidin-4-yl] sebacate, and [1,2,2,6,6-pentamethyl-piperidin-4-yl] methyl sebacate, TINUVIN 292 (yes: evaluated in MSDS), manufactured by BASF Each ink was subjected to the measurements of the viscosity (mPa·s) at 25° C., 45° C., and 60° C., and the coating film strength.

The results are presented in Tables 3 to 8.

The viscosity of each ink was measured by a cone plate-type rotary viscometer (manufactured by TOKI SANGYO CO., LTD.) with the temperature of circulating water being constantly set 25° C., 45° C., or 60° C. The temperature of 25° C. is temperature set considering typical room temperature, and the temperature of 45° C. or 60° C. is temperature set considering the specification of a commercially available heatable inkjet head, such as GEN 4, manufactured by Ricoh Industry Company, Ltd.

The photopolymerizable composition prepared with the predetermined formulation was used as it was for the evaluation performed by brush coating. For the evaluation as the inkjet ink, the photopolymerizable composition was handled in the following manner. After filtering the ink (photopolymerizable composition) through a membrane filter that was formed of a fluororesin had a pore size of 5 μm, an aluminum pouch bag having a shape illustrated in FIG. 1 was charged with the ink, and hermetically sealed so as to avoid inclusion of air bubbles. As illustrated in FIG. 2, The hermetically sealed pouch bag containing the ink was housed in a plastic cartridge. This cartridge was mounted to a casing adapted for housing it. In the casing, an ink flow channel was provided from the cartridge to a GEN4 head (manufactured by Ricoh Industry Company, Ltd.) Then, the ink was jetted from the head to produce a solid coating film. Note that, in both cases of the brush coating and inkjet printing, the conditions were adjusted so that the solid coating film had the average thickness of about 30 μm.

The printed solid coating film produced on the commercially available polycarbonate film (Lupilon E-2000, manufactured by Mitsubishi Engineering-Plastics Corporation, thickness: 100 μm) was cured with light having a wavelength range corresponding to the UVA region, at the illuminance of 0.2 W/cm$^2$, with the light dose of each of 1,200 (mJ/cm$^2$), and 2,000 (mJ/cm$^2$). The resulting coating film was provided for the coating film strength evaluation and light fastness evaluation.

The coating film strength was evaluated by evaluating the scratch hardness of the solid coating film cured by the application of the light in accordance with the pencil method as specified in JIS-K-5600-5-4. The pencil hardness includes H, F, HB, B, and 2B to 6B in this order from the hardest.

The light fastness was evaluated in the following manner. Each coating film produced under the condition of 1,200 mJ/cm$^2$ or 2,000 mJ/cm$^2$ was left to stand under light lit by a fluorescent lamp for capturing insects FL15BL (15W) manufactured by TOSHIBA LIGHTING & TECHNOLOGY CORPORATION for 72 hours. The color tone of the coating film before and after the test was measured by means of 938 spectrodensitometer manufactured by X-rite, and the degree of yellowing was calculated as the color tone difference ΔE.

Note that, in the case where the photopolymerizable composition is used as an inkjet ink, physical properties of the ink are preferably matched to the specifications required for the inkjet head for use. Various inkjet heads are on the marked from numerous manufacturers, and among them, there are inkjet heads having a function of adjusting temperature over a wide temperature range. Considering such market trends, the viscosity of the ink at temperature of 25° C. is preferably 2 mPa·s to 150 mPa·s. In the case where the ink is ejected at 25° C., the viscosity of the ink is more preferably 5 mPa·s to 18 mPa·s. As mentioned earlier, it is possible to use the temperature adjustment function of the ejection head. In the case where the viscosity of the ink is too high at 25° C., the viscosity thereof can be reduced by optionally heating the head. Assuming that the heating condition is 45° C. or 60° C., in the aforementioned case, the viscosity of the ink at 45° C. or 60° C. is preferably 5 mPa·s to 18 mPa·s.

TABLE 3

|  |  | Comp. Ex. 1 | Ex. 1 | Ex. 2 | Ex. 3 | Ex. 4 |
|---|---|---|---|---|---|---|
| a | a1 | 95 | 95 | 95 | 95 | 95 |
|   | a2 | 5 | 5 | 5 | 5 | 5 |
|   | a3 |   |   |   |   |   |
| b | b1 | 20 | 20 | 20 | 20 | 20 |
|   | b2 |   |   |   |   |   |
|   | b3 |   |   |   |   |   |
| c | c1 |   | 1.5 |   |   |   |
|   | c2 |   |   | 1.5 | 1.5 |   |
|   | c3 |   |   |   |   | 0.1 |
| d | d1 |   |   |   | 0.5 | 0.5 |
|   | d2 |   |   |   |   |   |
| Carbon black*1 |   |   |   |   |   |   |
| Viscosity at 25° C. |   | 8 | 9 | 9 | 9 | 8 |
| Viscosity at 45° C. |   | *2 | *2 | *2 | *2 | *2 |
| Viscosity at 60° C. |   | *2 | *2 | *2 | *2 | *2 |
| Inkjet printing | Set temperature of head | 25° C. | 25° C. | 25° C. | 25° C. | 25° C. |
|   | Coating film strength (1,200 mJ/cm$^2$) | F | Less than 6B | Less than 6B | Less than 6B | F |
|   | Coating film strength (2,000 mJ/cm$^2$) | H | H | H | H | H |
|   | ΔE | 12 | 6 | 6 | 4 | 9 |
| Brush coating | Coating film strength (1,200 mJ/cm$^2$) | F | Less than 6B | Less than 6B | Less than 6B | F |
|   | Coating film strength (2,000 mJ/cm$^2$) | H | H | H | H | H |
|   | ΔE | 12 | 7 | 6 | 4 | 9 |

|  |  | Comp. Ex. 2 | Ex. 5 | Ex. 6 | Ex. 7 | Ex. 8 | Comp. Ex. 3 |
|---|---|---|---|---|---|---|---|
| a | a1 | 50 | 50 | 50 | 50 | 50 | 50 |
|   | a2 | 50 | 50 | 50 | 50 | 50 | 50 |
|   | a3 |   |   |   |   |   |   |
| b | b1 | 10 | 10 | 10 | 10 | 10 | 5 |
|   | b2 |   |   |   |   |   |   |
|   | b3 |   |   |   |   |   |   |
| c | c1 |   | 1.5 |   |   |   |   |
|   | c2 |   |   | 1.5 | 1.5 |   |   |
|   | c3 |   |   |   |   | 0.1 |   |
| d | d1 |   |   |   | 0.5 | 0.5 |   |
|   | d2 |   |   |   |   |   |   |
| Carbon black*1 |   |   |   |   |   |   |   |
| Viscosity at 25° C. |   | 55 | 56 | 56 | 57 | 56 | 53 |
| Viscosity at 45° C. |   | 22 | 23 | 23 | 23 | 23 | 21 |
| Viscosity at 60° C. |   | 13 | 14 | 14 | 14 | 14 | 12 |
| Inkjet printing | Set temperature of head | 60° C. | 60° C. | 60° C. | 60° C. | 60° C. | 60° C. |
|   | Coating film strength (1,200 mJ/cm$^2$) | F | HB | HB | HB | F | *3 |

TABLE 3-continued

|  |  |  |  |  |  |  |  |
|---|---|---|---|---|---|---|---|
|  | Coating film strength (2,000 mJ/cm$^2$) | H | H | H | H | H | *3 |
|  | ΔE | 7 | 4 | 4 | 2 | 5 | *3 |
| Brush coating | Coating film strength (1,200 mJ/cm$^2$) | F | HB | HB | HB | F | *3 |
|  | Coating film strength (2,000 mJ/cm$^2$) | H | H | H | H | H | *3 |
|  | ΔE | 7 | 4 | 4 | 2 | 5 | *3 |

TABLE 4

|  |  | Comp. Ex. 4 | Ex. 9 | Ex. 10 | Ex. 11 | Ex. 12 |
|---|---|---|---|---|---|---|
| a | a1 | 70 | 70 | 70 | 70 | 70 |
|  | a2 | 10 | 10 | 10 | 10 | 10 |
|  | a3 | 20 | 20 | 20 | 20 | 20 |
| b | b1 | 15 | 15 | 15 | 15 | 15 |
|  | b2 |  |  |  |  |  |
|  | b3 |  |  |  |  |  |
| c | c1 |  | 1.5 |  |  |  |
|  | c2 |  |  | 1.5 | 1.5 |  |
|  | c3 |  |  |  |  | 0.1 |
| d | d1 |  |  |  | 0.5 | 0.5 |
|  | d2 |  |  |  |  |  |
| Carbon black*1 |  |  |  |  |  |  |
| Viscosity at 25° C. |  | 14 | 15 | 15 | 15 | 14 |
| Viscosity at 45° C. |  | 7 | 7 | 7 | 8 | 7 |
| Viscosity at 60° C. |  | *2 | *2 | *2 | *2 | *2 |
| Inkjet printing | Set temperature of head | 45° C. | 45° C. | 45° C. | 45° C. | 45° C. |
|  | Coating film strength (1,200 mJ/cm$^2$) | H | B | B | B | H |
|  | Coating film strength (2,000 mJ/cm$^2$) | H | H | H | H | H |
|  | ΔE | 9 | 4 | 4 | 3 | 6 |
| Brush coating | Coating film strength (1,200 mJ/cm$^2$) | H | B | B | B | H |
|  | Coating film strength (2,000 mJ/cm$^2$) | H | H | H | H | H |
|  | ΔE | 9 | 4 | 4 | 3 | 6 |

|  |  | Comp. Ex. 5 | Ex. 13 | Ex. 14 | Ex. 15 | Ex. 16 |
|---|---|---|---|---|---|---|
| a | a1 | 10 | 10 | 10 | 10 | 10 |
|  | a2 |  |  |  |  |  |
|  | a3 | 90 | 90 | 90 | 90 | 90 |
| b | b1 | 20 | 20 | 20 | 20 | 20 |
|  | b2 |  |  |  |  |  |
|  | b3 |  |  |  |  |  |
| c | c1 |  | 1.5 |  |  |  |
|  | c2 |  |  | 1.5 | 1.5 |  |
|  | c3 |  |  |  |  | 0.1 |
| d | d1 |  |  |  | 0.5 | 0.5 |
|  | d2 |  |  |  |  |  |
| Carbon black*1 |  |  |  |  |  |  |
| Viscosity at 25° C. |  | 18 | 19 | 19 | 19 | 19 |
| Viscosity at 45° C. |  | 15 | 16 | 16 | 16 | 15 |
| Viscosity at 60° C. |  | 9 | 9 | 9 | 10 | 9 |
| Inkjet printing | Set temperature of head | 60° C. | 60° C. | 60° C. | 60° C. | 60° C. |
|  | Coating film strength (1,200 mJ/cm$^2$) | H | B | B | B | F |
|  | Coating film strength (2,000 mJ/cm$^2$) | H | H | H | H | H |
|  | ΔE | 14 | 7 | 7 | 4 | 10 |
| Brush coating | Coating film strength (1,200 mJ/cm$^2$) | H | B | B | B | F |
|  | Coating film strength (2,000 mJ/cm$^2$) | H | H | H | H | H |
|  | ΔE | 14 | 8 | 7 | 4 | 10 |

|  |  | Comp. Ex. 6 | Ex. 17 | Ex. 18 | Ex. 19 | Ex. 20 |
|---|---|---|---|---|---|---|
| a | a1 | 50 | 50 | 50 | 50 | 50 |
|  | a2 |  |  |  |  |  |
|  | a3 | 50 | 50 | 50 | 50 | 50 |
| b | b1 | 20 | 20 | 20 | 20 | 20 |
|  | b2 |  |  |  |  |  |
|  | b3 |  |  |  |  |  |
| c | c1 |  | 1.5 |  |  |  |
|  | c2 |  |  | 1.5 | 1.5 |  |
|  | c3 |  |  |  |  | 0.1 |
| d | d1 |  |  |  | 0.5 | 0.5 |
|  | d2 |  |  |  |  |  |
| Carbon black*1 |  |  |  |  |  |  |
| Viscosity at 25° C. |  | 16 | 17 | 17 | 17 | 16 |
| Viscosity at 45° C. |  | 8 | 8 | 8 | 9 | 8 |
| Viscosity at 60° C. |  | *2 | *2 | *2 | *2 | *2 |
| Inkjet printing | Set temperature of head | 45° C. | 45° C. | 45° C. | 45° C. | 45° C. |
|  | Coating film strength (1,200 mJ/cm$^2$) | H | 2B | 2B | 2B | F |
|  | Coating film strength (2,000 mJ/cm$^2$) | H | H | H | H | H |
|  | ΔE | 13 | 6 | 6 | 4 | 9 |
| Brush coating | Coating film strength (1,200 mJ/cm$^2$) | H | 2B | 2B | 2B | F |
|  | Coating film strength (2,000 mJ/cm$^2$) | H | H | H | H | H |
|  | ΔE | 13 | 7 | 6 | 4 | 9 |

TABLE 5

|   |   | Ex. 10 | Ex. 21 | Ex. 22 | Ex. 11 | Ex. 23 | Ex. 24 | Ex. 25 |
|---|---|---|---|---|---|---|---|---|
| a | a1 | 70 | 70 | 70 | 70 | 70 | 70 | 70 |
|   | a2 | 10 | 10 | 10 | 10 | 10 | 10 | 10 |
|   | a3 | 20 | 20 | 20 | 20 | 20 | 20 | 20 |
| b | b1 | 15 |   |   | 15 | 15 | 15 | 15 |
|   | b2 |   | 15 | 13 |   |   |   |   |
|   | b3 |   |   | 2 |   |   |   |   |
| c | c1 |   |   |   |   |   |   |   |
|   | c2 | 1.5 | 1.5 | 1.5 | 1.5 | 1.5 | 1.5 | 1.5 |
|   | c3 |   |   |   |   |   |   |   |
| d | d1 |   |   |   | 0.5 |   |   | 0.5 |
|   | d2 |   |   |   |   | 0.5 |   |   |
| Carbon black*1 |   |   |   |   |   |   | 0.05 | 0.05 |
| Viscosity at 25° C. |   | 15 | 14 | 15 | 15 | 15 | 15 | 16 |
| Viscosity at 45° C. |   | 7 | 8 | 8 | 8 | 8 | 8 | 8 |
| Viscosity at 60° C. |   | *2 | *2 | *2 | *2 | *2 | *2 | *2 |
| Inkjet printing | Set temperature of head | 45° C. | 45° C. | 45° C. | 45° C. | 45° C. | 45° C. | 45° C. |
|   | Coating film strength (1,200 mJ/cm$^2$) | B | B | B | B | B | Less than 6B | Less than 6B |
|   | Coating film strength (2,000 mJ/cm$^2$) | H | H | H | H | H | H | H |
|   | ΔE | 4 | 4 | 4 | 3 | 3 | 4 | 3 |
| Brush coating | Coating film strength (1,200 mJ/cm$^2$) | B | B | B | B | B | Less than 6B | Less than 6B |
|   | Coating film strength (2,000 mJ/cm$^2$) | H | H | H | H | H | H | H |
|   | ΔE | 4 | 4 | 4 | 3 | 3 | 4 | 3 |

TABLE 6

|   |   | Comp. Ex. 1 | Ex. 26 | Ex. 27 | Comp. Ex. 2 | Ex. 28 | Ex. 29 |
|---|---|---|---|---|---|---|---|
| a | a1 | 95 | 95 | 95 | 50 | 50 | 50 |
|   | a2 | 5 | 5 | 5 | 50 | 50 | 50 |
|   | a3 |   |   |   |   |   |   |
| b | b1 | 20 | 20 | 20 | 10 | 10 | 10 |
|   | b2 |   |   |   |   |   |   |
|   | b3 |   |   |   |   |   |   |
| c | c4 |   | 0.5 | 0.5 |   | 0.5 | 0.5 |
| d | d1 |   |   | 0.5 |   |   | 0.5 |
|   | d2 |   |   |   |   |   |   |
| Carbon black*1 |   |   |   |   |   |   |   |
| Viscosity at 25° C. |   | 8 | 8 | 9 | 55 | 56 | 57 |
| Viscosity at 45° C. |   | *2 | *2 | *2 | 22 | 22 | 23 |
| Viscosity at 60° C. |   | *2 | *2 | *2 | 13 | 13 | 14 |
| Inkjet printing | Set temperature of head | 25° C. | 25° C. | 45° C. | 60° C. | 60° C. | 60° C. |
|   | Coating film strength (1,200 mJ/cm$^2$) | F | F | F | F | F | F |
|   | ΔE | 12 | 8 | 7 | 7 | 4 | 3 |
| Brush coating | Coating film strength (1,200 mJ/cm$^2$) | F | F | F | F | F | F |
|   | ΔE | 12 | 8 | 7 | 7 | 4 | 3 |

TABLE 7

|   |   | Comp. Ex. 4 | Ex. 30 | Ex. 31 | Ex. 32 | Ex. 33 |
|---|---|---|---|---|---|---|
| a | a1 | 70 | 70 | 70 | 70 | 70 |
|   | a2 | 10 | 10 | 10 | 10 | 10 |
|   | a3 | 20 | 20 | 20 | 20 | 20 |

TABLE 7-continued

| | | | | | | |
|---|---|---|---|---|---|---|
| b | b1 | 15 | 15 | 15 | 15 | 15 |
| | b2 | | | | | |
| | b3 | | | | | |
| c | c4 | | 0.5 | 0.5 | 0.7 | 0.7 |
| d | d1 | | | 0.5 | | 0.7 |
| | d2 | | | | | |
| Carbon black*1 | | | | | | |
| Viscosity at 25° C. | | 14 | 15 | 15 | 15 | 16 |
| Viscosity at 45° C. | | 7 | 7 | 7 | 7 | 8 |
| Viscosity at 60° C. | | *2 | *2 | *2 | *2 | *2 |
| Inkjet printing | Set temperature of head | 45° C. | 45° C. | 45° C. | 45° C. | 60° C. |
| | Coating film strength (1,200 mJ/cm$^2$) | H | H | H | H | H |
| | ΔE | 9 | 6 | 5 | 5 | 4 |
| Brush coating | Coating film strength (1,200 mJ/cm$^2$) | H | H | H | H | H |
| | ΔE | 9 | 6 | 5 | 5 | 4 |

| | | Comp. Ex. 5 | Ex. 34 | Ex. 35 | Comp. Ex. 6 | Ex. 36 | Ex. 37 |
|---|---|---|---|---|---|---|---|
| a | a1 | 10 | 10 | 10 | 50 | 50 | 50 |
| | a2 | | | | | | |
| | a3 | 90 | 90 | 90 | 50 | 50 | 50 |
| b | b1 | 20 | 20 | 20 | 20 | 20 | 20 |
| | b2 | | | | | | |
| | b3 | | | | | | |
| c | c4 | | 0.5 | 0.5 | | 0.5 | 0.5 |
| d | d1 | | | 0.5 | | | 0.5 |
| | d2 | | | | | | |
| Carbon black*1 | | | | | | | |
| Viscosity at 25° C. | | 18 | 19 | 20 | 16 | 17 | 17 |
| Viscosity at 45° C. | | 15 | 15 | 16 | 8 | 8 | 9 |
| Viscosity at 60° C. | | 9 | 9 | 10 | *2 | *2 | *2 |
| Inkjet printing | Set temperature of head | 60° C. | 60° C. | 60° C. | 45° C. | 45° C. | 45° C. |
| | Coating film strength (1,200 mJ/cm$^2$) | H | H | H | H | H | H |
| | ΔE | 14 | 8 | 7 | 13 | 8 | 7 |
| Brush coating | Coating film strength (1,200 mJ/cm$^2$) | H | H | H | H | H | H |
| | ΔE | 14 | 8 | 7 | 13 | 8 | 7 |

TABLE 8

| | | Ex. 38 | Ex. 39 | Ex. 40 | Ex. 41 | Ex. 42 |
|---|---|---|---|---|---|---|
| a | a1 | 70 | 70 | 70 | 70 | 70 |
| | a2 | 10 | 10 | 10 | 10 | 10 |
| | a3 | 20 | 20 | 20 | 20 | 20 |
| b | b1 | | | | 15 | 15 | 15 |
| | b2 | 15 | 13 | | | |
| | b3 | | 2 | | | |
| c | c4 | 0.5 | 0.5 | 0.5 | 0.5 | 0.5 |
| d | d1 | | | | | 0.5 |
| | d2 | | | 0.5 | | |
| Carbon black*1 | | | | | 0.05 | 0.05 |
| Viscosity at 25° C. | | 14 | 14 | 15 | 15 | 16 |
| Viscosity at 45° C. | | 7 | 7 | 7 | 8 | 8 |
| Viscosity at 60° C. | | *2 | *2 | *2 | *2 | *2 |
| Inkjet printing | Set temperature of head | 45° C. | 45° C. | 45° C. | 45° C. | 45° C. |
| | Coating film strength (1,200 mJ/cm$^2$) | H | H | H | H | H |
| | ΔE | 6 | 6 | 5 | 6 | 5 |
| Brush coating | Coating film strength (1,200 mJ/cm$^2$) | H | H | H | H | H |
| | ΔE | 6 | 6 | 5 | 6 | 5 |

*1 carbon black "#10" manufactured by Mitsubishi Chemical Corporation blended with a dispersing agent "Solsperse 32000" manufactured by Lubrizol Japan Co. are blended at the weight ratio of 3/1
*2 The measurement of the viscosity was not performed, as the ink could be ejected at the temperature lower than the described temperature.
*3 The evaluation was not carried out, as the ink was not cured (liquid remained or being tacky).

As it is clear from the results of Tables 3 to 8 comparing with Comparative Examples 1, 2, 4, 5, and 6, as the amount of the polymerization initiator is lager, the value of ΔE becomes large, and yellowing becomes more significant. As it can be seen in Comparative Examples 2 and 3, when the amount of the polymerization initiator is excessively small, it is difficult to cure. Unless 10 parts by mass or greater of the polymerization initiator is blended relative to 100 parts by mass of the monomer, it is difficult to attain sufficient curing property on practical use.

By comparing Comparative Example 1 with Examples 1 to 4, Comparative Example 2 with Examples 5 to 8, Comparative Example 4 with Examples 9 to 12, Comparative Example 5 with Examples 13 to 16, and Comparative Example 6 with Examples 17 to 20, it has been confirmed that the value of ΔE can be reduced, and light fastness can be improved by blending the triazine compound in the photopolymerizable composition, although there is a difference in the degree, depending on a type and an amount of the triazine compound. It has been found that strength of the coating film can be maintained under the sufficient light irradiation conditions, although there is a case where the coating film strength may reduce depending on the light dose applied during the curing.

As seen in Examples 3, 7, 11, 15, and 19, it has been confirmed that the value of ΔE is reduced and the light fastness can be improved by using the hindered amine compound in combination. Moreover, it has been confirmed that the value of ΔE is reduced and the light fastness can be improved by using the hindered amine compound in combination regardless of the type of the hindered amine compound for use, as seen in Example 23. However, even such component, a small amount of which is blended, is more preferably negative for skin sensitization. Use of materials that have a problem of skin sensitization, such as a mixture of bis[1,2,2,6,6-pentamethyl-piperidin-4-yl]sebacate and [1,2,2,6,6-pentamethyl-piperidin-4-yl]methyl sebacate is preferably kept as minimum as possible.

As in Examples 10, 21, and 22, it has been found that, other than 1-hydroxy-cyclohexyl-phenyl-ketone, use of 2-hydroxy-2-methyl-1-phenyl-propan-1-one, or 2-hydroxy-1-{4-[4-(2-hydroxy-2-methyl-propionyl)benzyl]phenyl}-2-methyl-1-propan-1-one, as the polymerization initiator, can attain the same effect.

It has been confirmed from Examples 24 and 25 that the value of ΔE is reduced and the light fastness can be improved by blending therein the triazine compound, even when the colorant is contained in the photopolymerizable composition for the purpose of tinting the photopolymerizable composition in a pale color. It has been found that strength of the coating film can be maintained under the sufficient light irradiation conditions, although there is a case where the coating film strength may reduce depending on the light dose applied during the curing.

As in Examples 5 to 12, the coating film strength can be maintained by appropriately adjusting a blending amount of caprolactone-modified dipentaerythritol hexaacrylate that is polyfunctional acrylate having high polymerization reactivity, even when the blending amount of the polymerization initiator is reduced. Comparing with Examples 1 to 4, and 13 to 20, therefore, the value of ΔE can be reduced and the light fastness can be improved.

The effectiveness in improving the light fastness was confirmed with any of 2-[4-{(2-hydroxy-3-(C10-16 alkyl)oxypropyl)oxy}-2-hydroxyphenyl]-4,6-bis(2,4-dimethylphenyl)-1,3,5-triazine, 2-[4-{(2-hydroxy-3-(2'-ethyl)hexyl)oxy}-2-hydroxyphenyl]-4,6-bis(2,4-dimethylphenyl)-1,3,5-triazine, or 2,4-bis(2-hydroxy-4-butoxyphenyl)-6-(2,4-bis-butoxyphenyl)-1,3,5-triazine. However, use of 2-[4-{(2-hydroxy-3-(2'-ethyl)hexyl)oxy}-2-hydroxyphenyl]-4,6-bis(2,4-dimethylphenyl)-1,3,5-triazine is preferable, as a commercial product thereof, which does not contain an organic solvent, can be readily available, and it has high solubility to the photopolymerizable composition.

As it is made clear by comparing Comparative Examples 1, 2, 4, 5, and 6 with Examples 26 to 37, it has been found that the value of ΔE is reduced and the light fastness is improved by using 2-[2-hydroxy-4-(1-octyloxycarbonylethoxy)phenyl]-4,6-bis(4-phenylphenyl)-1,3,5-triazine. Moreover, it has been found that the value of ΔE is further reduced and the light fastness is further improved by using the hindered amine compound in combination. Furthermore, in both cases, the coating film strength is not reduced. Since photocuring and yellowing are both phenomena caused by application of light, excellent curing ability is obtained but resulting in significant yellowing if the photopolymerizable composition or cured coating film thereof passes through light sufficiently, and the photopolymerizable composition cannot be cured and a coating film cannot be produced, if the photopolymerizable composition shields light. However, it has been found that the light fastness can be improved while maintaining the coating film strength by blending 2-[2-hydroxy-4-(1-octyloxycarbonylethoxy)phenyl]-4,6-bis(4-phenylphenyl)-1,3,5-triazine, which is an effect that has not been seen with other triazine compounds.

As in Examples 32 and 33, moreover, it has been found that the value of ΔE is further reduced and the light fastness is further improved by adjusting blending amounts of 2-[2-hydroxy-4-(1-octyloxycarbonylethoxy)phenyl]-4,6-bis(4-phenylphenyl)-1,3,5-triazine, and the hindered amine compound.

Moreover, it has been confirmed that the value of ΔE is further reduced and the light fastness can be further improved by using the hindered amine compound in combination regardless of the type of the hindered amine compound for use, as seen in Examples 31 and 40. However, even such component, a small amount of which is blended, is more preferably negative for skin sensitization. Use of materials that have a problem of skin sensitization, such as a mixture of bis[1,2,2,6,6-pentamethyl-piperidin-4-yl]sebacate and [1,2,2,6,6-pentamethyl-piperidin-4-yl]methyl sebacate is preferably kept as minimum as possible.

As in Examples 30, 38, and 39, it has been found that, other than 1-hydroxy-cyclohexyl-phenyl-ketone, use of 2-hydroxy-2-methyl-1-phenyl-propan-1-one, or 2-hydroxy-1-{4-[4-(2-hydroxy-2-methyl-propionyl)benzyl]phenyl}-2-methyl-1-propan-1-one, as the polymerization initiator, can attain the same effect.

It has been confirmed from Examples 41 and 42 that the value of ΔE is reduced and the light fastness can be improved by blending 2-[2-hydroxy-4-(1-octyloxycarbonylethoxy)phenyl]-4,6-bis(4-phenylphenyl)-1,3,5-triazine and the hindered amine compound, even when the colorant is contained in the photopolymerizable composition for the purpose of tinting the photopolymerizable composition in a pale color.

As in Examples 28 to 33, the coating film strength can be maintained by appropriately adjusting a blending amount of caprolactone-modified dipentaerythritol hexaacrylate that is polyfunctional acrylate having high polymerization reactivity, even when the blending amount of the polymerization initiator is reduced. Comparing with Examples 26, 27, and 34 to 37, therefore, the value of ΔE can be reduced and the light fastness can be improved.

Note that, the ethylene oxide-modified trimethylol propane trimethacrylate is represented by the general formula $[CH_3CH_2C-\{(O-CH_2CH_2)_n-OCOC(CH_3)=CH_2\}_3]$. Regarding the length "n" of the ethylene oxide segment, the larger value of "n" means a lager molecular weight, which increases the viscosity. Therefore, such ethylene oxide-modified trimethylol propane trimethacrylate is difficult to be used as a material for an inkjet ink, and also increases a molecular weight between crosslink points in a crosslinked polymer structure formed during curing to reduce the crosslink density. As a result, it is difficult to attain sufficient coating strength. Therefore, the value of n is preferably as small as possible. On the other hand, trimethylol propane trimethacrylate, in which the value of n is 0 (n=0), is a compound marked with a symbol "N" that denotes the environmental hazardless and marked with a risk phrase "R51/53" that denotes acute aquatic toxicity and long-term adverse effect in the classification according to EU. Directive 67/548/EEC. Considering a possible influence to the environment, therefore, use of trimethylol propane trimethacrylate is preferably avoided. The ethylene oxide-modified trimethylol propane trimethacrylate used in Examples has 1 as the value of n (n=1), which is not particularly problem in a viscosity as a raw material blended in an inkjet ink. The photopolymerizable composition to which this ethylene oxide-modified trimethylol propane trimethacrylate is blended has sufficient coating film strength and no problem of skin sensitization, and is not classified as a material exhibiting the environmental hazardless, or acute aquatic toxicity and long-term adverse effect. Accordingly, as for the ethylene oxide-modified trimethylol propane trimethacrylate, that of n=1 is particularly preferable.

In all of Examples and Comparative Examples, moreover, no significant difference has not been seen between inkjet printing and brush coating. Moreover, all the photopolymerizable compositions have very weak odor as an ink, to which any particular consideration should be taken in handling thereof.

The embodiments of the present invention are, for example, as follows:

<1> A non-aqueous photopolymerizable composition, containing:
  a (meth)acrylic acid ester compound containing at least diethylene glycol dimethacrylate;
  a photoradical polymerization initiator, which is at least one selected from the group consisting of 1-hydroxy-cyclohexyl-phenyl-ketone, 2-hydroxy-2-methyl-1-phenyl-propan-1-one, and 2-hydroxy-1-{4-[4-(2-hydroxy-2-methyl-propionyl)benzyl]phenyl}-2-methyl-1-propan-1-one; and
  a triazine compound,
  wherein an amount of the photoradical polymerization initiator is 10 parts by mass or greater relative to 100 parts by mass of the (meth)acrylic acid ester compound.

<2> The photopolymerizable composition according to <1>, further containing caprolactone-modified dipentaerythritol hexaacrylate.

<3> The photopolymerizable composition according to any of <1> or <2>, wherein the triazine compound is at least one selected from the group consisting of 2-[2-hydroxy-4-(1-octyloxycarbonylethoxy)phenyl]-4,6-bis(4-phenylphenyl)-1,3,5-triazine, and 2-[4-{(2-hydroxy-3-(2'-ethyl)hexyl)oxy}-2-hydroxyphenyl]-4,6-bis(2,4-dimethylphenyl)-1,3,5-triazine.

<4> The photopolymerizable composition according to any one of <1> to <3>, wherein an amount of the triazine compound is 0.1 parts by mass to 5 parts by mass relative to 100 parts by mass of the (meth)acrylic acid ester compound.

<5> The photopolymerizable composition according to any one of <1> to <4>, further containing a hindered amine compound.

<6> The photopolymerizable composition according to <5>, wherein the hindered amine compound is bis[2,2,6,6-tetramethyl-1-(octyloxy)piperidin-4-yl]sebacate.

<7> The photopolymerizable composition according to any of <5> or <6>, wherein an amount of the hindered amine compound is 0.1 parts by mass to 5 parts by mass relative to 100 parts by mass of the (meth)acrylic acid ester compound.

<8> An inkjet ink, containing:
  the photopolymerizable composition according to any one of <1> to <7>.

<9> An ink cartridge, containing:
  the inkjet ink according to <8>; and
  a container.

REFERENCE SIGNS LIST 200 ink cartridge
241 ink bag
242 ink inlet
243 ink outlet
244 cartridge case

The invention claimed is:

1. A photopolymerizable composition, comprising:
  a (meth)acrylic acid ester compound containing at least diethylene glycol dimethacrylate;
  a photoradical polymerization initiator, which is at least one selected from the group consisting of 1-hydroxy-cyclohexyl-phenyl-ketone, 2-hydroxy-2-methyl-1-phenyl-propan-1-one, and 2-hydroxy-1-{4-[4-(2-hydroxy-2-methyl-propionyl)benzyl]phenyl}-2-methyl-1-propan-1-one; and
  a triazine compound,
  wherein an amount of the photoradical polymerization initiator is 10 parts by mass or greater relative to 100 parts by mass of the (meth)acrylic acid ester compound, and
  wherein an amount of the triazine compound is 0.1 parts by mass to 5 parts by mass relative to 100 parts by mass of the (meth)acrylic acid ester compound.

2. The photopolymerizable composition according to claim 1, further comprising caprolactone-modified dipentaerythritol hexaacrylate.

3. The photopolymerizable composition according to claim 1, wherein the triazine compound is at least one selected from the group consisting of 2-[2-hydroxy-4-(1-octyloxycarbonylethoxy)phenyl]-4,6-bis(4-phenylphenyl)-1,3,5-triazine, and 2-[4-{(2-hydroxy-3-(2'-ethyl)hexyl)oxy}-2-hydroxyphenyl]-4,6-bis(2,4-dimethylphenyl)-1,3,5-triazine.

4. The photopolymerizable composition according to claim 1, further comprising a hindered amine compound.

5. The photopolymerizable composition according to claim 4, wherein the hindered amine compound is bis[2,2,6,6-tetramethyl-1-(octyloxy)piperidin-4-yl]sebacate.

6. The photopolymerizable composition according to claim 4, wherein an amount of the hindered amine compound is 0.1 parts by mass to 5 parts by mass relative to 100 parts by mass of the (meth)acrylic acid ester compound.

7. An inkjet ink, comprising:
  the photopolymerizable composition according to claim 1.

8. An ink cartridge, comprising:
  the inkjet ink according to claim 7; and
  a container.

9. An inkjet ink ejection device comprising:
  the ink cartridge according to claim 8.

10. The inkjet ink according to claim 7, wherein the inkjet ink has a viscosity of 5 mPa·s to 18 mPa·s at 25° C.

11. An ink ejection method comprising:
  applying to a base the inkjet ink according to claim 7.

12. The ink ejection method according to claim 11, wherein the applying is performed by inkjet ejection or coating.

13. The ink ejection method according to claim 11, wherein the base is a non-absorbent base.

14. The photopolymerizable composition according to claim 1, wherein the photopolymerizable composition contains no organic solvent.

15. A method for coating a base comprising applying the photopolymerizable composition according to claim 1 to a base and, optionally, photopolymerizing it.

16. A photopolymerizable composition, comprising:
- a (meth)acrylic acid ester compound containing at least diethylene glycol dimethacrylate;
- a photoradical polymerization initiator, which is at least one selected from the group consisting of 1-hydroxy-cyclohexyl-phenyl-ketone, 2-hydroxy-2-methyl-1-phenyl-propan-1-one, and 2-hydroxy-1-{4-[4-(2-hydroxy-2-methyl-propionyl)benzyl]phenyl}-2-methyl-1-propan-1-one;
- a triazine compound; and
- a hindered amine compound, which is bis[2,2,6,6-tetramethyl-1-(octyloxy)piperidin-4-yl]sebacate,
- wherein an amount of the hindered amine compound is 0.1 parts by mass to 5 parts by mass relative to 100 parts by mass of the (meth)acrylic acid ester compound.

* * * * *